United States Patent
Heo et al.

(10) Patent No.: US 9,832,103 B2
(45) Date of Patent: Nov. 28, 2017

(54) METHOD AND APPARATUS FOR SECURE COMMUNICATION VIA MULTIPLE COMMUNICATION PATHS

(71) Applicant: ELECTRONICS AND TELECOMMUNICATIONS RESEARCH INSTITUTE, Daejeon (KR)

(72) Inventors: Hwan-Jo Heo, Daejeon (KR); Jung-Ho Myung, Daejeon (KR); Nam-Seok Ko, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 52 days.

(21) Appl. No.: 14/946,972

(22) Filed: Nov. 20, 2015

(65) Prior Publication Data

US 2016/0149871 A1    May 26, 2016

(30) Foreign Application Priority Data

Nov. 24, 2014   (KR) .................. 10-2014-0164776
Sep. 7, 2015    (KR) .................. 10-2015-0126537

(51) Int. Cl.
*H04L 29/06*    (2006.01)
*H04L 12/721*   (2013.01)

(52) U.S. Cl.
CPC .............. *H04L 45/14* (2013.01); *H04L 63/18* (2013.01)

(58) Field of Classification Search
CPC ................................ H04L 45/14; H04L 63/18
(Continued)

(56) References Cited

U.S. PATENT DOCUMENTS 6,182,214 B1 * 1/2001 Hardjono ................ H04L 9/085
                                                     380/255
2004/0025018 A1 * 2/2004 Haas ....................... H04L 45/26
                                                     713/168
(Continued)

FOREIGN PATENT DOCUMENTS

KR    10-2014-0050526 A    4/2014
KR    10-2014-0052243 A    5/2014
(Continued)

OTHER PUBLICATIONS

Multiple description coding of free viewpoint video for multi-path network streaming, Liu et al, 10.1109/GLOCOM.2012.6503434, IEEE, 2012.*

(Continued)

*Primary Examiner* — Jahangir Kabir
(74) *Attorney, Agent, or Firm* — LRK Patent Law Firm

(57) ABSTRACT

A method for sending and receiving a data through multiple communication paths and an apparatus for receiving a data through multiple communication paths. A method for receiving a data through multiple communication paths by an apparatus for receiving a data includes receiving at least t (here, 0<t=n and n and t are natural numbers) of n shares generated from one unit data by a threshold encryption scheme by an apparatus for sending a data and sent through multiple communication paths on a network; and recovering the unit data using the at least t shares. According to exemplary embodiments of the present invention, data may be sent and received while ensuring confidentiality, integrity, and availability.

12 Claims, 9 Drawing Sheets

(58) Field of Classification Search
USPC .................................................. 713/163, 168
See application file for complete search history.

(56) References Cited

U.S. PATENT DOCUMENTS

| | | | |
|---|---|---|---|
| 2010/0030789 A1* | 2/2010 | Goto .................. | G06F 11/1443 707/636 |
| 2012/0226802 A1* | 9/2012 | Wu ....................... | H04L 1/1825 709/224 |
| 2014/0115326 A1 | 4/2014 | Kim et al. | |
| 2014/0115334 A1* | 4/2014 | Resch .................... | H04L 9/085 713/168 |
| 2014/0146706 A1 | 5/2014 | Chung et al. | |
| 2015/0067331 A1* | 3/2015 | Jelitto ............... | G06F 17/30156 713/168 |
| 2015/0271061 A1 | 9/2015 | Byun | |

FOREIGN PATENT DOCUMENTS

| | | |
|---|---|---|
| KR | 10-2014-0075837 A | 6/2014 |
| WO | 2014/062028 A1 | 4/2014 |

OTHER PUBLICATIONS

Assignment of Sensors for Multiple Tasks Using Path Information, Toriumi et al, 10.1109/EUC.2011.19, IEEE, 2011.*
Panagiotis Papadimitratos et al, "Secure Data Transmission in Mobile Ad Hoc Networks", ACM Workshop on Wireless Security (WiSe 2003), pp. 41-50, San Diego, CA, Sep. 19, 2003.

* cited by examiner

METHOD AND APPARATUS FOR SECURE COMMUNICATION VIA MULTIPLE COMMUNICATION PATHS

CROSS REFERENCE TO RELATED APPLICATION

This application claims the benefit of Korean Patent Application No. 10-2014-0164776, filed on Nov. 24, 2014, and Korean Patent Application No. 10-2015-0126537, filed on Sep. 7, 2015, which are hereby incorporated by reference in their entirety into this application.

BACKGROUND

1. Technical Field

Exemplary embodiments of the present invention relate to a method for sending and receiving a data through multiple communication paths and an apparatus for receiving a data through multiple communication paths.

2. Description of the Related Art

In communication networks, communication methods that utilize multiple communication paths have become attractive recently as communication parties often have access to multiple communication channels; mobile devices usually equip with network interfaces to multiple wireless networks such as cellular and wireless local access network (WLAN.) Multi-homing, subscribing to multiple Internet service providers, is also widely adapted in datacenters and enterprise networks.

The literature considers two different goals in such communication methods: high bandwidth achieved by aggregating the capacity of multiple communication paths and availability due to having one or more backup communication paths that can be utilized in case of unavailability of the primary communication path. Those methods are implemented in network protocols such as Multi-Path Transmission Control Protocol (MP-TCP), Stream Control Transmission Protocol (SCTP), Internet Protocol Multimedia Subsystem (IMS), and Session Initiation Protocol (SIP).

SUMMARY

Exemplary embodiments of the present invention provide a method for providing secure communication through multiple communication paths.

Exemplary embodiments of the present invention provide a method for sending and receiving a data with confidentiality, integrity, and availability.

A method for sending a data through multiple communication paths by an apparatus for sending a data according to an embodiment of the present invention includes generating n (n is a natural number) shares from one unit data using a threshold encryption scheme; and sending the n shares to an apparatus for receiving a data through multiple communication paths on a network.

The shares may be generated by the number of communication paths between the apparatus for sending a data and the apparatus for receiving a data.

The sending of the n shares may include sending the n shares together with identification information on the unit data in the case in which the unit data is one of a plurality of unit data divided from one data.

A method for receiving a data through multiple communication paths by an apparatus for receiving a data according to an embodiment of the present invention includes receiving at least t (here, $0<t=n$ and n and t are natural numbers) of n shares generated from one unit data by a threshold encryption scheme by an apparatus for sending a data and sent through multiple communication paths on a network; and recovering the unit data using the at least t shares.

The method for receiving a data through multiple communication paths may further include requesting the apparatus for sending a data to resend shares that are not received among then shares in the case in which shares less than t of the n shares generated from the unit data are received.

The method for receiving a data through multiple communication paths may further include generating recovered data from each of share combinations consisting of the t shares in the case in which shares exceeding t of the n shares are received; and confirming integrity of the received shares by comparing the plurality of recovered data with each other.

The confirming of the integrity may include deciding that all of the received shares have not been forged in the case in which all of the plurality of recovered data are the same as each other.

The confirming of the integrity may include deciding that at least one of the received shares has been forged in the case in which recovered data that are not same as each other among the plurality of recovered data are present.

The confirming of the integrity may include confirming share combinations used to generate recovered data that are same as each other among the plurality of recovered data; finding a share set consisting of shares belonging to at least one of the confirmed share combinations; confirming a share that does not belong to the share set among the received shares; and deciding that the share that does not belong to the share set among the received shares has been forged.

The method for receiving a data through multiple communication paths may further include performing an operation for reestablishing one or more communication paths to the apparatus for sending a data so that a communication path through which a share decided to be forged among the received shares is sent is excluded.

The method for receiving a data through multiple communication paths may further include requesting the apparatus for sending a data to resend the n shares or performing an operation for reestablishing one or more communication paths to the apparatus for sending a data in the case in which recovered data that are the same as each other among the recovered data are not present.

The shares may be generated by the number of communication paths between the apparatus for sending a data and the apparatus for receiving a data.

The n shares may be received together with identification information on the unit data to which the n shares belong.

An apparatus for receiving a data through multiple communication paths according to an embodiment of the present invention includes a communicating unit configured to receive at least t (here, $0<t=n$ and n and t are natural numbers) of n shares generated from one unit data by a threshold encryption scheme by an apparatus for sending a data and sent through multiple communication paths on a network; and a decrypting unit configured to recover the unit data using the at least t shares.

The decrypting unit may generate recovered data from each of share combinations consisting of the t shares in the case in which shares exceeding t of the n shares are received, and confirm integrity of the received shares by comparing the plurality of recovered data with each other.

The decrypting unit may decide that all of the received shares have not been forged in the case in which all of the plurality of recovered data are the same as each other.

The decrypting unit may decide that at least one of the received shares has been forged in the case in which recovered data that are not same as each other among the plurality of recovered data are present.

The decrypting unit may confirm share combinations used to generate recovered data that are same as each other among, the plurality of recovered data, find a share set consisting of shares belonging to at least one of the confirmed share combinations, confirm a share that does not belong to the share set among the received shares, and decide that the share that does not belong to the share set among the received shares has been forged.

The apparatus for receiving a data may further include a communication path establishing unit configured to perform an operation for reestablishing one or more communication paths to the apparatus for sending a data so that a communication path through which a share decided to be forged among the received shares is sent is excluded.

The apparatus for receiving a data may further include a communication path establishing unit configured to request the apparatus for sending a data to resend the n shares or perform an operation for reestablishing one or more communication paths to the apparatus for sending a data in the case in which recovered data that are the same as each other among the recovered data are not present.

According to the exemplary embodiments of the present invention, data may be sent and received while ensuring confidentiality, integrity, and availability.

According to the exemplary embodiments of the present invention, an attacker usurping shares less than a predetermined number may not recover original data. Therefore, the exemplary embodiments of the present invention may provide the confidentiality.

According to the exemplary embodiments of the present invention, in the case in which a predetermined number or more of shares are secured, the integrity of the shares may be confirmed using combinations of the predetermined number or more of shares.

According to the exemplary embodiments of the present invention, the integrity of the shares is confirmed, thereby making it possible to confirm a communication path in which it is doubted that forgery is performed.

According to the exemplary embodiments of the present invention, even through forgery is performed in shares less than a predetermined number or an error is generated, original data may be recovered using the remaining shares. Therefore, the exemplary embodiments of the present invention may provide the availability.

DESCRIPTION OF THE EXEMPLARY EMBODIMENTS

Hereinafter, in describing exemplary embodiments of the present invention, when it is decided that a detailed description for the known functions or components related to the present invention may unnecessarily obscure the gist of the present invention, the detailed description will be omitted.

Hereinafter, exemplary embodiments of the present invention will be described with reference to the accompanying drawings.

Figure 1:
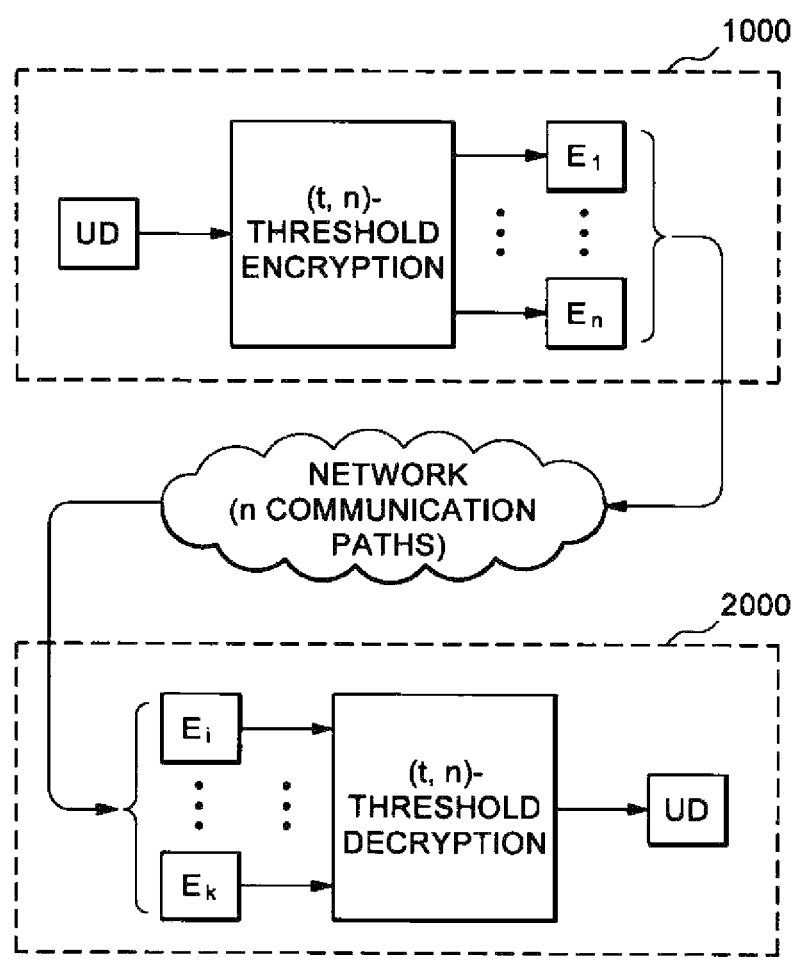
FIG. 1 is an illustrative view for describing a method for sending and receiving a data through multiple communication paths according to an exemplary embodiment of the present invention.

FIG. 1 is an illustrative view for describing a method for sending and receiving a data through multiple communication paths according to an exemplary embodiment of the present invention.

An apparatus 1000 for sending a data may generate a plurality of shares from one unit data (UD) using a threshold encryption scheme. The apparatus 1000 for sending a data may send the plurality of shares generated from one unit data to an apparatus 2000 for receiving a data through several communication paths present on a network.

The apparatus 1000 for sending a data may determine the number of shares that are to be generated from one unit data in consideration of the number of communication paths present between the apparatus 1000 for sending a data and the apparatus 2000 for receiving a data. In an exemplary embodiment, the apparatus 1000 for sending a data may generate the shares from one unit data by the number of communication paths present between the apparatus 1000 for sending a data and the apparatus 2000 for receiving a data. For example, when it is assumed that the number of communication paths between the apparatus 1000 for sending a data and the apparatus 2000 for receiving a data is four, the apparatus 1000 for sending a data may generate four shares from one unit data.

The apparatus 1000 for sending a data may send the shares generated from one unit data to the apparatus 2000 for receiving a data through multiple communication paths on the network. In other words, the apparatus 1000 for sending a data may determine communication paths through which the respective shares are to be sent so that shares sent through the same communication path among the shares generated from one unit data are not present.

The threshold encryption scheme used in exemplary embodiments of the present invention may be a (t, n)-threshold encryption scheme. The (t, n)-threshold encryption scheme is a scheme that may recover an original unit data using t or more shares in the case in which n shares are generated from one unit data. Here, n is a natural number, and t is a natural number less than n.

Therefore, in the case in which n communication paths are present between the apparatus 1000 for sending a data and the apparatus 2000 for receiving a data, the apparatus 1000 for sending a data according to an exemplary embodiment of the present invention may generate n shares $E_1$ to $E_n$ from one unit data and send the generated n shares to the apparatus 2000 for receiving a data through multiple communication paths on the network.

The apparatus 2000 for receiving a data may receive the plurality of shares generated from one unit data through multiple communication paths on the network. The apparatus 2000 for receiving a data may recover the original unit data from the received shares using a threshold decryption scheme.

As described above, when the t or more of the n shares generated from one unit data by the (t, n)-threshold encryption scheme may be secured, the original unit data may be recovered using the secured t or more shares. Therefore, even in the case in which n-t shares are lost on the network and only the t shares are received, the apparatus 200 for receiving a data may recover the original unit data using the received t shares $E_i$ to $E_k$. In other words, in the case in which t or more of the n shares generated from one unit data are received, the apparatus 200 for receiving a data may recover the original unit data using the received t or more shares.

The shares may be inserted into a packet having a preset form and be sent. A structure of the packet into which the shares are inserted may be changed depending on a kind of used network or a kind of used protocol. Hereinafter, for convenience of explanation, the packet into which the shares are inserted is called a share packet.

Figure 2:
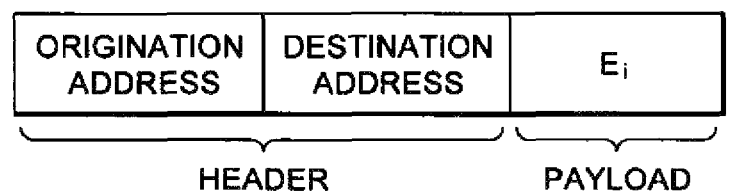
FIG. 2 is an illustrative view for describing a share packet according to an exemplary embodiment of the present invention.

FIG. 2 is an illustrative view for describing a share packet according to an exemplary embodiment of the present invention.

The apparatus for sending a data may insert one share into one share packet and send one share packet. The share packet may include a header and a payload. The header may include an origination address and a destination address. The payload may include one share.

In the case in which a data that is to be sent is variable or has a size larger than a preset size, the apparatus for sending a data may divide the corresponding data to generate a plurality of unit data and apply the threshold encryption scheme to the respective unit data. This will be described with reference to FIG. 3.

Figure 3:
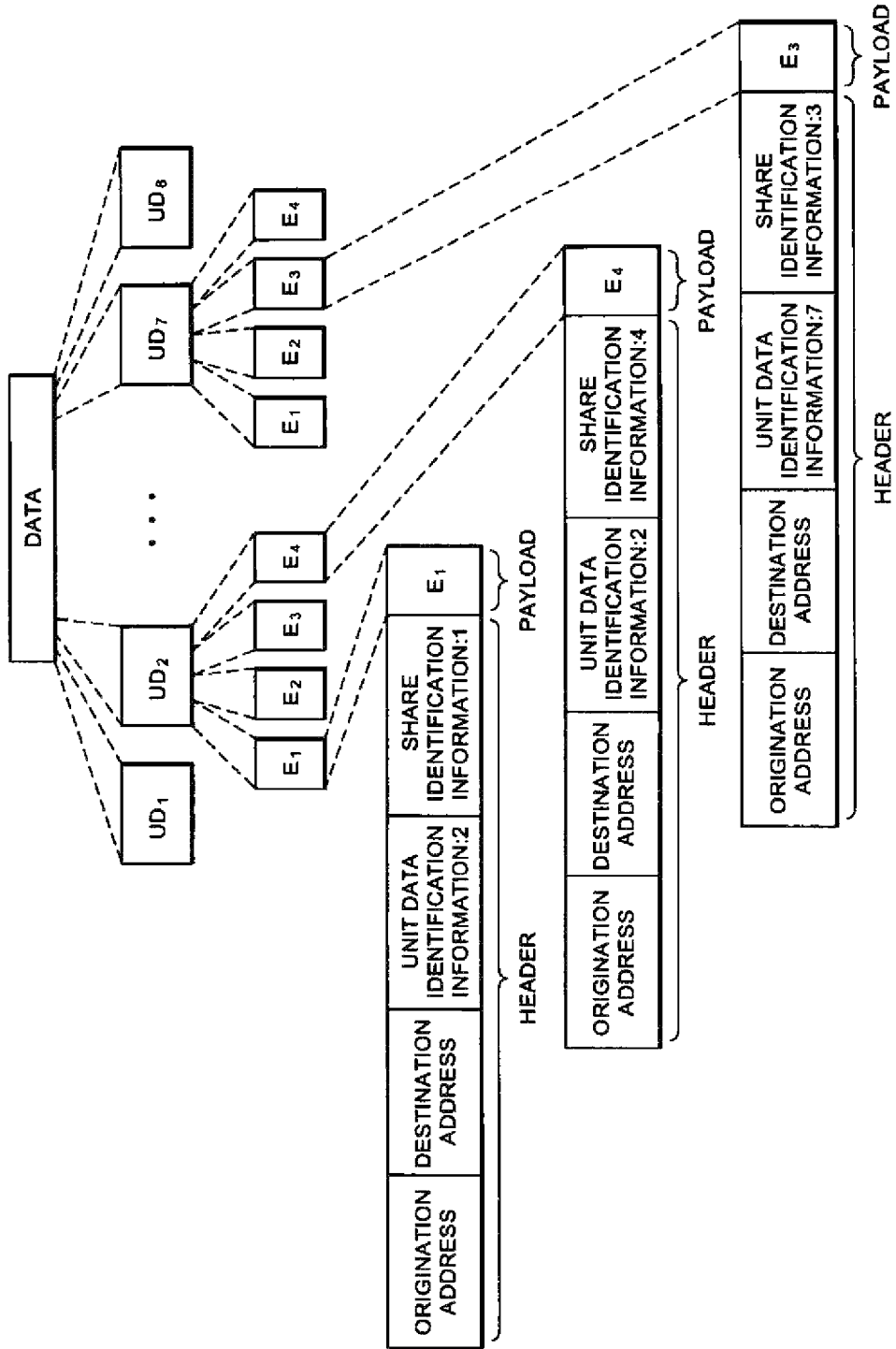
FIG. 3 is an illustrative view for describing data dividing and share generating processes according to an exemplary embodiment of the present invention.

FIG. 3 is an illustrative view for describing data dividing and share generating processes according to an exemplary embodiment of the present invention.

As described above, in the case in which the data that is to be sent is variable or has the size larger than the preset size, the apparatus for sending a data may divide the corresponding data to generate the plurality of unit data. In FIG. 3, as an example, an example in which eight unit data $UD_1$ to $UD_8$ are generated from one data is illustrated.

The apparatus for sending a data may apply the threshold encryption scheme to the respective unit data to generate a plurality of shares from the respective unit data. In FIG. 3, as an example, an example in which four shares are generated from the respective unit data is illustrated.

Meanwhile, as described above, the apparatus for sending a data may insert one share into one share packet and send one share packet. In the case in which the plurality of unit data are generated by dividing one data as illustrated in FIG. 3, the apparatus for sending a data may allow unit data identification information used to identify from which unit data the respective shares are generated to be further included in the respective share packets.

For example, referring to FIG. 3, it may be appreciated that unit data identification information "2" is inserted into a header of a share packet including shares generated from the unit data $UD_2$ and unit data identification information "7" is inserted into a header of a share packet including shares generated from the unit data $UD_7$.

Therefore, in the case in which the plurality of unit data are generated by dividing one data, the apparatus for receiving a data may confirm from which unit data shares included in the respective share packets are generated with reference to the unit data identification information. In the case in which the apparatus for receiving a data receives t or more share packets into which the same unit data identification information is inserted, the apparatus for receiving a data may recover the original unit data using the shares included in the share packets.

Meanwhile, the apparatus for sending a data may allow share identification information used to identify what share of the shares generated from the unit data is the share inserted into the share packet to be further included in the respective share packets.

For example, referring to FIG. 3, it may be appreciated that share identification information "1" is inserted into a header of a share packet including a first share $E_1$ of the shares generated from the unit data $UD_2$, share identification information "4" is inserted into a header of a share packet including a fourth share $E_4$ of the shares generated from the unit data $UD_2$, and share identification information "3" is inserted into a header of a share packet including a third share $E_3$ of the shares generated from the unit data $UD_7$.

The share identification information may be used for the apparatus for receiving a data to request the apparatus for sending a data to resend the shares. This will be described with reference to FIG. 4.

Meanwhile, in the case of using the (t, n)-threshold encryption scheme, at least t shares need to be secured in order to recover the original unit data. Therefore, in the case in which shares less than t of the n shares generated from one unit data are received or in the case in which the number of available shares is less than t due to an error of some of t or more shares even though the t or more shares are received, the apparatus for receiving a data may request the apparatus for sending a data to resend the shares generated from the corresponding unit data. This will be described with reference to FIG. 4.

Figure 4:
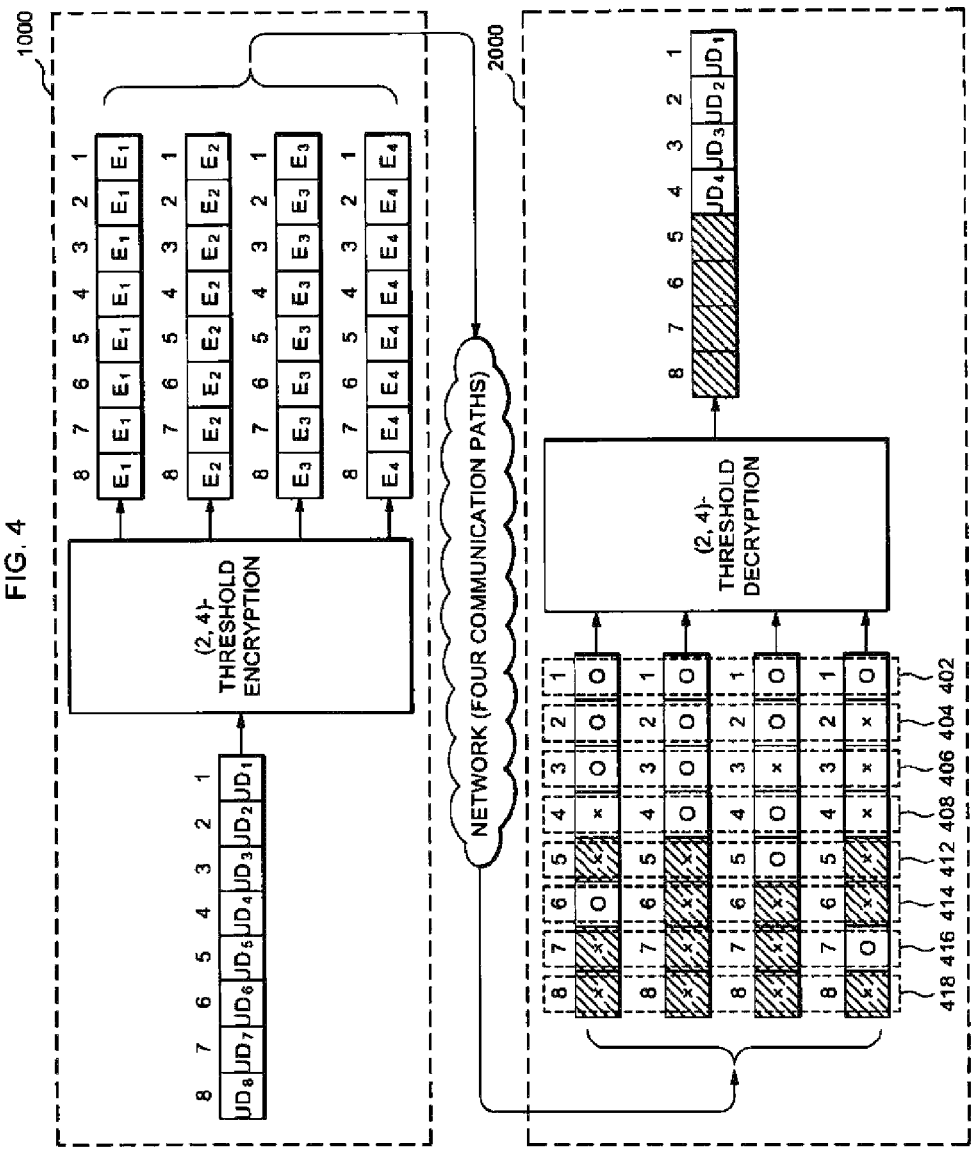
FIG. 4 is an illustrative view for describing shares that need to be resent according to an exemplary embodiment of the present invention.

FIG. 4 is an illustrative view for describing shares that need to be resent according to an exemplary embodiment of the present invention.

In an exemplary embodiment described with reference to FIG. 4, a case in which eight unit data $UD_1$ to $UD_8$ are generated by dividing one data is assumed. In addition, a case in which four shares $E_1$ to $E_4$ are generated from the respective unit data by applying a (2, 4)-threshold encryption scheme to the respective unit data is assumed. In FIG. 4, numerals stated above the unit data $UD_1$ to $UD_8$ and the shares $E_1$ to $E_4$ are unit data identification information.

In the case of using the (2, 4)-threshold encryption scheme, when at least two of the four shares generated from one unit data are present, the original unit data may be recovered. Therefore, in the case in which a share less than two of the four shares generated from one unit data is received, it is required that the shares generated from the corresponding unit data is resent.

Meanwhile, even in the case in which two or more of the four shares generated from one unit data are received, an error may be present in some shares. In this case, when the number of errorless shares, that is, available shares, among the received shares is less than 2, it is required that the shares generated from the corresponding unit data is resent.

In FIG. 4, for convenience of explanation, shares received by the apparatus for receiving a data are marked by "O", and shares that are not received by the apparatus for receiving a data or are received by the apparatus for receiving a data, but have an error are marked by "X".

Each of the share groups 402, 404, 406, and 408 may include two or more available shares. Therefore, the apparatus for receiving a data, may recover the unit data $UD_1$, $UD_2$, $UD_3$, and $UD_4$.

On the other hand, each of the share groups 412, 414, 416, and 418 may include an available share less than two. Therefore, the apparatus for receiving a data may not recover the unit data $UD_5$, $UD_6$, $UD_7$, and $UD_8$. That is, it is required that shares that are not received, or shares that are received but have an error among shares generated from the unit data $UD_5$, $UD_6$, $UD_7$, and $UD_8$ is resent.

When it is required that shares generated from specific unit data are resent, the apparatus for receiving a data may request the apparatus for sending a data to resend the corresponding shares. In the above-mentioned example, the apparatus for receiving a data may request the apparatus for sending a data to resend the shares that are not received or the shares that are received, but have the error among the shares generated from the unit data $UD_5$, $UD_6$, $UD_7$, and $U_8$. That is, the apparatus for receiving a data may request the apparatus for sending a data to resend shares marked by "X" among shares present in the share groups 412, 414, 416, and 418.

When it is required that the shares are resent, the share identification information may be used. As described above, the share identification information used to identify the shares included in the corresponding share packets may be inserted into the respective share packets. Therefore, the apparatus for receiving a data may confirm what shares of the shares generated from the unit data are the shares that are not received or the shares that are received, but have the error with reference to the corresponding share identification information, and request the apparatus for sending a data to resend the confirmed shares.

Meanwhile, attackers may be present in some of several communication paths on the network through which the shares are sent. Therefore, it is likely that the shares received through the communication paths in which the attackers are present would be forged by the attackers. Therefore, in an exemplary embodiment of the present invention, a method for checking integrity of shares is provided. This will be described with reference to FIG. 5 and FIG. 6.

Figure 5:
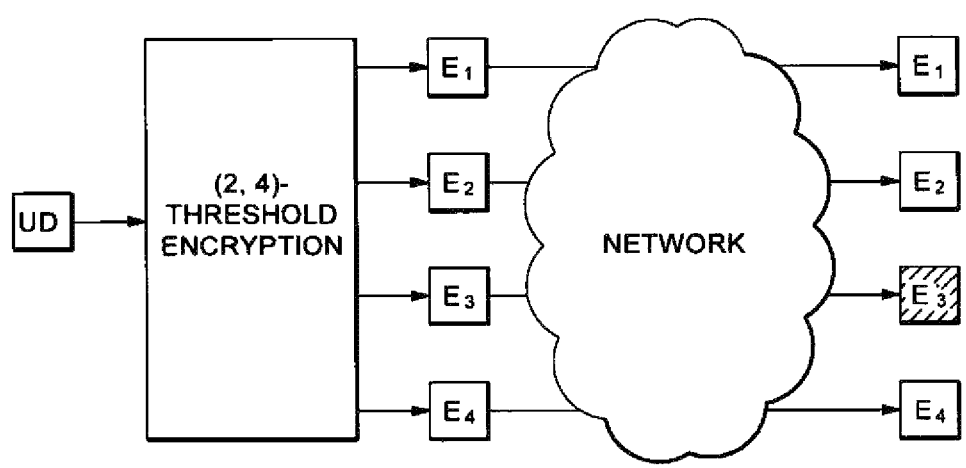
FIG. 5 is an illustrative view for describing forgery of a share generated in a communication path on a network.

FIG. 5 is an illustrative view for describing forgery of a share generated in a communication path on a network.

In an exemplary embodiment described with reference to FIG. 5, a case in which four communication paths are present between the apparatus for sending a data and the apparatus for receiving a data and four shares are generated from one unit data by the (2, 4)-threshold encryption scheme is assumed.

As described above, the attackers may be present in some of several communication paths on the network, and may forge shares sent through the corresponding communication paths. In FIG. 5, as an example, a case in which some $E_3$ of the shares generated by the apparatus for sending a data is forged into a share $E'_3$ on the network is illustrated.

When it is assumed that the apparatus for receiving a data has received all of the four shares, the forged share $E_3$ may be used to recover the unit data. In this case, it is likely that a data different from the original unit data will be recovered.

Figure 6:
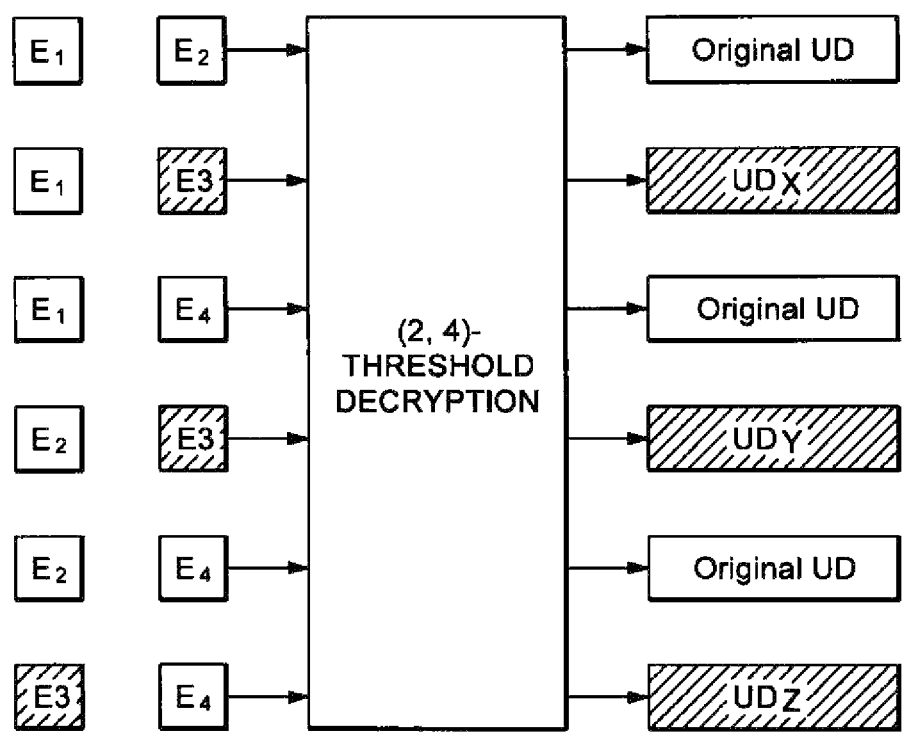
FIG. 6 is an illustrative view for describing a method for checking integrity according to an exemplary embodiment of the present invention.

FIG. 6 is an illustrative view for describing a method for checking integrity according to an exemplary embodiment of the present invention.

In an exemplary embodiment described with reference to FIG. 6, a case in which four communication paths are present between the apparatus for sending a data and the apparatus for receiving a data and four shares are generated from one unit data by the (2, 4)-threshold encryption scheme is assumed. In addition, a case in which all of the four shares generated by the apparatus for sending a data are received by the apparatus for receiving a data is assumed.

The apparatus for receiving a data may perform an integrity check using combinations of the received shares. For example, when the (t, n)-threshold encryption scheme is used and shares exceeding t shares are received, the apparatus for receiving a data may recover the original unit data from one or more share combinations. For example, in the case in which the apparatus for receiving a data receives t or more shares, that is r shares (here, t<r=n) of the n shares, the apparatus for receiving a data may recover the original unit data from each of $rCt$ share combinations. Here, rCt may be calculated as represented by Equation 1. In the case in which all of the unit data recovered from each of the rCt share combinations are the same as each other, it may be considered that any share has not been forged.

$$_rC_t = \frac{r!}{t! \cdot (r-t)!} \qquad \text{[Equation 1]}$$

In the case in which the unit data that are not same as each other among the unit data recovered from each of the rCt share combinations are present, it may be considered that at least one share has been forged. For example, as illustrated in FIG. 6, in a situation in which all of the four shares $E_1$, $E_2$, $E_3$, and $E_4$ generated from one unit data by the (2, 4)-threshold encryption scheme are received, there are 4C2 share combinations, that is, six share combinations ($E_1+E_2$, $E_1+E_3$, $E_1+E_4$, $E_2+E_3$, $E_2+E_4$, $E_3+E_4$) from which the unit data may be recovered are present. The apparatus for receiving a data may recover the unit data from each of the six share combinations ($E_1+E_2$, $E_1+E_3$, $E_1+E_4$, $E_2+E_3$, $E_2+E_4$, $E_3+E_4$). When a unit data that is not same as other unit data among the recovered six unit data is present, it may be considered that at least one of shares used to recover the corresponding unit data has been forged.

For example, referring to FIG. 6, it may be appreciated that three unit data Original UD are the same as each other and three unit data UDX, UDY, and UDZ are not same as other unit data. Therefore, it may be considered that at least one of shares used to recover the unit data UDX, UDY, and UDZ has been forged.

In order to detect the forged share, the apparatus for receiving a data may find a share set including shares used to recover the unit data that are the same as each other. For example, referring to FIG. 6, it may be appreciated that the shares used to recover the unit, data Original UD are $E_1$, $E_2$, and $E_4$. Therefore, the apparatus for receiving a data may find a share set {$E_1$, $E_2$, $E_4$} including the corresponding shares $E_1$, $E_2$, and $E_4$.

The apparatus for receiving a data may confirm a share that does not belong to the share set {$E_1$, $E_2$, $E_4$} among the shares $E_1$, $E_2$, $E_3$, and $E_4$ used to recover the unit data and decide that the share that does not belong to the share set {$E_1$, $E_2$, $E_4$} has been forged. For example, in an exemplary embodiment described with reference to FIG. 6, since the share that does not belong to the share set {$E_1$, $E_2$, $E_4$} is $E_3$, the apparatus for receiving a data may decide that $E_3$ has been forged.

Figure 7:
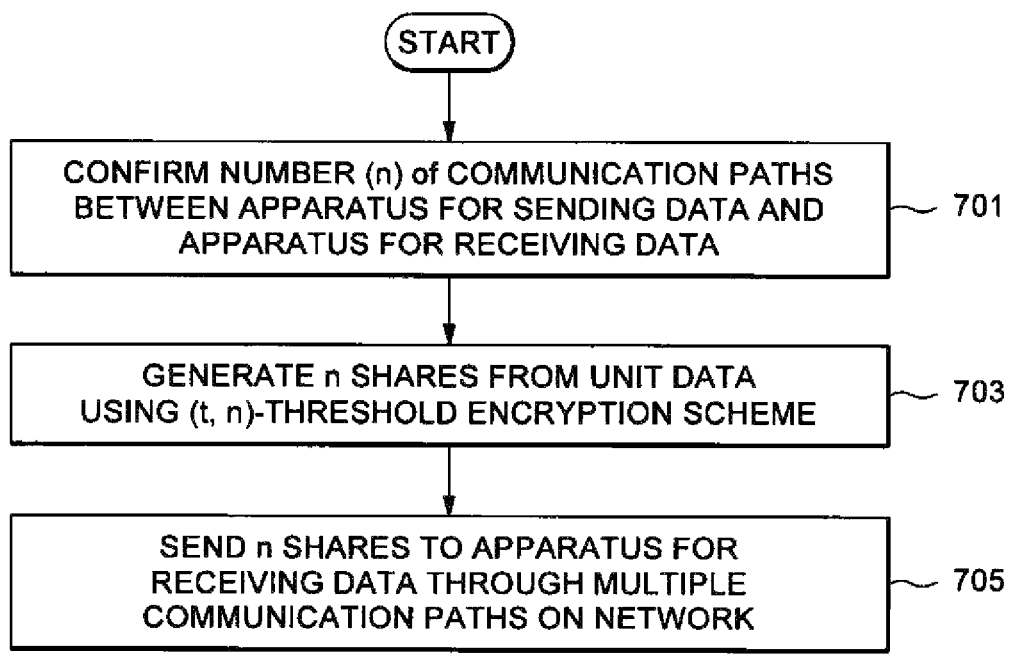
FIG. 7 is a flow chart for describing a method for sending a data according to an exemplary embodiment of the present invention.

FIG. 7 is a flow chart for describing a method for sending a data according to an exemplary embodiment of the present invention. According to exemplary embodiments, some of steps illustrated in FIG. 7 may be omitted.

In Step 701, the apparatus for sending a data may confirm the number of communication paths between the apparatus for sending a data and the apparatus for receiving a data.

In Step 703, the apparatus for sending a data may generate n shares from one unit data using the (t, n)-threshold encryption scheme.

In the case in which a data to be encrypted has a size larger than a preset size, the apparatus for sending a data may divide the corresponding data to generate a plurality of unit data. In addition, the apparatus for sending a data may apply the (t, n)-threshold encryption scheme to the respective unit data to generate the n shares from the respective unit data.

In Step 705, the apparatus for sending a data, may send the n shares generated from one unit data to the apparatus for receiving a data through multiple communication paths on the network. The apparatus for sending a data may send at least one of the unit data identification information and the share identification information together with the respective shares.

Figure 8:
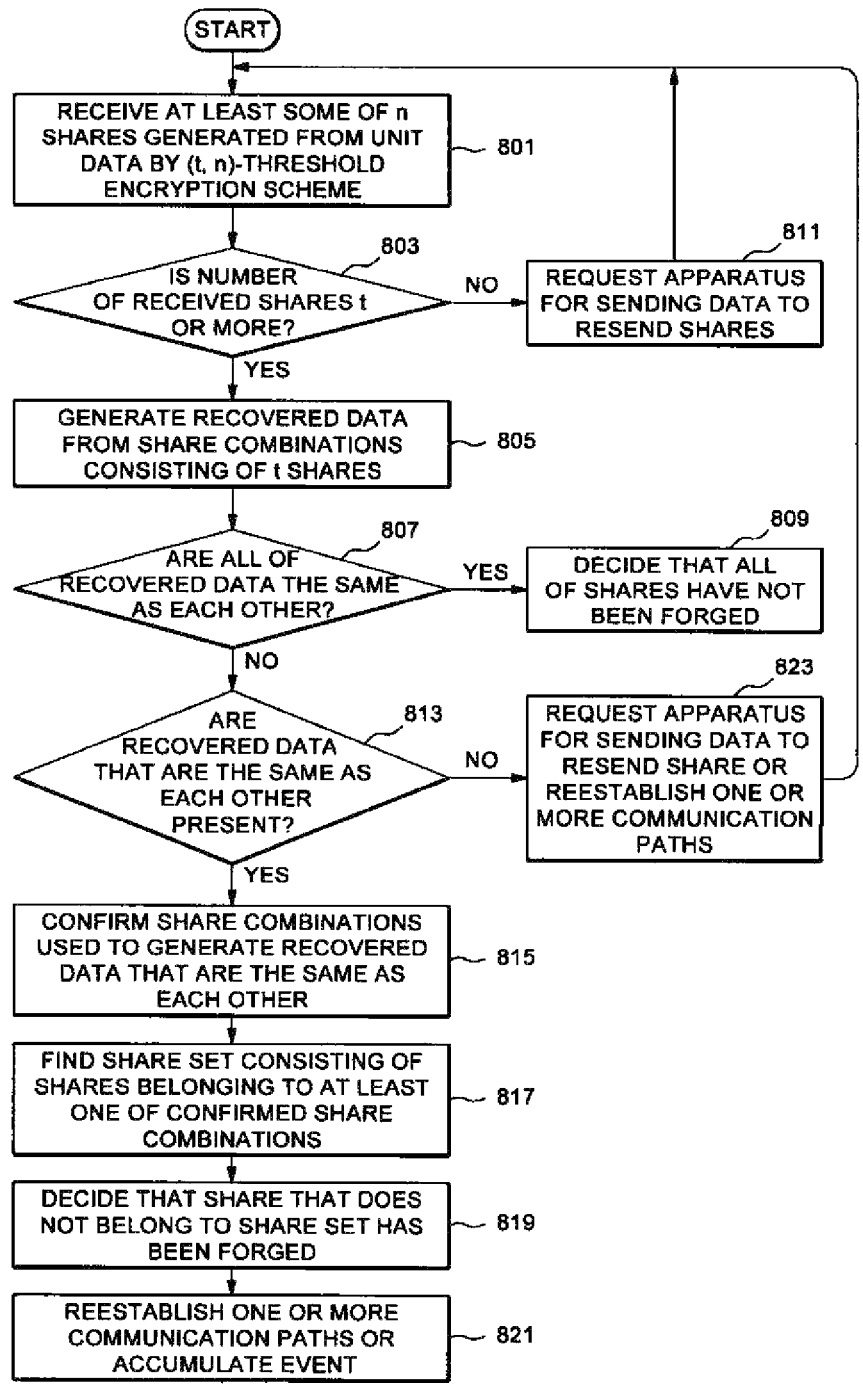
FIG. 8 is a flow chart for describing a method for receiving a data according to an exemplary embodiment of the present invention.

FIG. 8 is a flow chart for describing a method for receiving a data according to an exemplary embodiment of the present invention. According to exemplary embodiments, some of steps illustrated in FIG. 8 may be omitted.

In Step 801, the apparatus for receiving a data may receive at least some of the n shares generated from one unit data by the (t, n)-threshold encryption scheme.

In Step 803, the apparatus for receiving a data may confirm whether or not t or more of the n shares generated from one unit data have been received. In the case in which a plurality of unit data are generated by dividing one data, the respective shares may be received together with the unit data identification information. Therefore, also in this case, the apparatus for receiving a data may confirm how many of the n shares generated from one unit data have been received using the unit data identification information.

Meanwhile, the respective shares may be received together with the share identification information. Therefore, the apparatus for receiving a data may confirm what shares of the shares generated from the unit data are shares that are not received or the shares that are received, but have the error with reference to the share identification information.

In the case in which shares less than t of the shares generated from one unit data are received, the apparatus for receiving a data may proceed to Step 811 to request the apparatus for sending a data to resend the shares that required to be resent, that is, the shares that are not received or the shares that are received, but have the error.

In the case in which t or more of the shares generated from one unit data are received, the apparatus for receiving a data proceeds to Step 805.

In Step 805, the apparatus for receiving a data may generate recovered data from each of the share combinations consisting of t shares. For example, as described above, in the case in which the t or more shares, that is, r (here, t<r=n) shares are received, the apparatus for receiving a data may generate rCt recovered data from the rCt share combinations.

In Step 807, the apparatus for receiving a data may decide whether or not all of the rCt recovered data are the same as each other. In the case which all of the rCt recovered data are the same as each other, the apparatus for receiving a data may proceed to Step 809 to decide that all of the received shares have not been forged.

Meanwhile, in Step 813, the apparatus for receiving a data may decide whether or not recovered data that are the same as each other among the rCt recovered data are present. In the case in which it is decided that the recovered data that are the same as each other are not present, the apparatus for receiving a data may proceed to Step 823 to request the apparatus for sending a data to resend all of the shares generated from the corresponding unit data or perform an operation for reestablishing one or more communication paths to the apparatus for sending a data.

Meanwhile, in Step 815 to which the apparatus for receiving a data proceeds as a result of deciding that the recovered data that are the same as each other among the rCt recovered data are present, the apparatus for receiving a data may confirm share combinations used to generate the recovered data that are the same as each other.

In Step 817, the apparatus for receiving a data may find a share set consisting of shares belonging to at least one of the confirmed share combinations.

In Step 819, the apparatus for receiving a data may confirm a share that does not belong to the share set among the received shares and decide that the confirmed share has been forged.

In Step 821, the apparatus for receiving a data may perform an operation for reestablishing one or more communication paths to the apparatus for sending a data or accumulate a forgery event in order to exclude a communication path through which the forged share is received. The accumulated forgery event may be used to reestablish one or more communication paths later.

Figure 9:
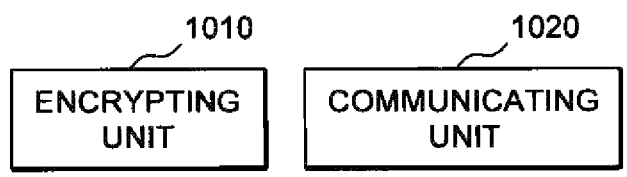
FIG. 9 is a block diagram for describing an apparatus for sending a data according to an exemplary embodiment of the present invention.

FIG. 9 is a block diagram for describing an apparatus for sending a data according to an exemplary embodiment of the present invention.

Referring to FIG. 9, the apparatus for sending a data according to an exemplary embodiment of the present invention may include an encrypting unit 1010 and a communicating unit 1020. According to exemplary embodiments, at least some of the above-mentioned components may be omitted.

The encrypting unit 1010 may generate the n shares from one unit data using the threshold encryption scheme and send the generated shares to the apparatus for receiving a data through the communicating unit 1020. The n shares may be sent to the apparatus for receiving a data through multiple communication paths on the network.

The threshold encryption scheme used to generate the n shares may be the (t, n)-threshold encryption scheme.

The number of shares generated from one unit data may be the same as that of communication paths between the apparatus for sending a data and the apparatus for receiving a data. That is, n may be the number of communication paths between the apparatus for sending a data and the apparatus for receiving a data.

In the case in which a data has a size larger than a preset size, the encrypting unit 1010 may divide the corresponding data to generate a plurality of unit data. The encrypting unit 1010 may apply the threshold encryption scheme to the respective unit data to generate the n shares from the respective unit data. In this case, the encrypting unit 1010 may send the respective shares together with the unit data identification information.

The encrypting unit 1010 may send the respective shares together with the share identification information.

Figure 10:
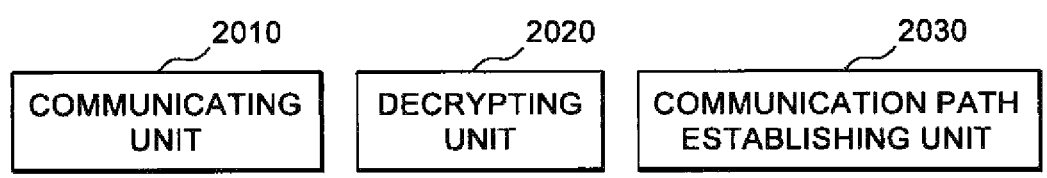
FIG. 10 is a block diagram for describing an apparatus for receiving a data according to an exemplary embodiment of the present invention.

FIG. 10 is a block diagram for describing an apparatus for receiving a data according to an exemplary embodiment of the present invention.

Referring to FIG. 10, the apparatus for receiving a data according to an exemplary embodiment of the present invention may include a communicating unit 2010, a decrypting unit 2020, and a communication path establishing unit 2030. According to exemplary embodiments, at least some of the above-mentioned components may be omitted.

The communicating unit 2010 may transfer the shares received through several communication paths on the network to the decrypting unit 2020. The received shares may be the shares generated from one unit data by the threshold encryption scheme. The shares generated from one unit data may be received through multiple communication paths on the network. The threshold encryption scheme used to generate the received shares may be the (t, n)-threshold encryption scheme.

The decrypting unit 2020 may recover the unit data using at least t shares in the case in which at least t of the n shares generated from one unit data are received.

The decrypting unit 2020 may generate the recovered data from each of the share combinations consisting of the t shares in the case in which shares exceeding t of the n shares generated from one unit data are received. The decrypting unit 2020 may confirm integrity of the received shares by comparing the plurality of generated recovered data with each other.

The decrypting unit 2020 may decide that all of the received shares have not been forged in the case in which all of the plurality of recovered data are the same as each other.

The decrypting unit 2020 may decide that at least one of the received shares has been forged in the case in which the recovered data that are not same as each other among the plurality of recovered data are present. The decrypting unit 2020 may use combinations in confirming the forged share. For example, the decrypting unit 2020 may confirm the share combinations used to generate the recovered data that are the same as each other among the plurality of recovered data. The decrypting unit 2020 may find the share set consisting of the shares belonging to at least one of the confirmed share combinations. The decrypting unit 2020 may confirm the share that does not belong to the share set among the received shares and decide that the confirmed share has been forged.

The communication path establishing unit 2030 may perform the operation for reestablishing one or more communication paths to the apparatus for sending a data. For example, the communication path establishing unit 2030 may perform the operation for reestablishing one or more communication paths to the apparatus for sending a data so that a communication path through which the share decided to be forged among the received shares is sent is excluded.

The communication path establishing unit 2030 may accumulate the forgery event. For example, the communication path establishing unit 2030 may record through which communication path the share decided to be forged has been received as log information. The accumulated forgery event may be used to reestablish one or more communication paths.

The communication path establishing unit 2030 may request the apparatus for sending a data to resend the shares or perform the operation for reestablishing one or more communication paths to the apparatus for sending a data in the case in which the recovered data that are the same as each other among the plurality of recovered data are not present.

The exemplary embodiments of the present invention described above may be implemented by any various methods. For example, the exemplary embodiments of the present invention may be implemented by hardware, software, or a combination thereof. In the case in which the exemplary embodiments of the present invention are implemented by the software, the exemplary embodiments of the present invention may be implemented by software executed on one or more processors using various operating systems or platforms. Additionally, this software may be created using any of a plurality of appropriate programming languages and be compiled by a machine language code or an intermediate code that may be executed in a framework or a virtual machine.

In addition, in the case in which the exemplary embodiments of the present invention are executed on one or more processors, the exemplary embodiments of the present invention may be implemented by a processor-readable medium (for example, a memory, a floppy disk, a hard disk, a compact disk, an optical disk, a magnetic tape, or the like) in which one or more programs for performing a method for implementing various exemplary embodiments of the present invention described above are recorded.

What is claimed is:

1. A method for receiving a data through multiple communication paths by an apparatus for receiving a data, comprising the step of:
   receiving at least t of n shares generated from unit data by a threshold encryption scheme, the t of n shares being transmitted from an apparatus for sending a data through multiple communication paths via a network, wherein $0<t\le n$ and n and t are natural numbers;
   recovering the unit data using the at least t shares, the step of recovering the unit data comprising:
   determining whether or not t or more of the n shares generated from the unit data have been received;
   in response to detection of shares less than t of the n shares being received, requesting the apparatus for sending a data to resend shares that are not received among the n shares;
   in response to detection of shares exceeding the t of n shares being received, generating recovered data from each of share combinations consisting of the t shares;
   determining integrity of the received shares by comparing the plurality of recovered data with each other; and
   determining whether at least one of the received shares having been forged in response to detection that a share of recovered data (a) not being same as each other among the plurality of recovered data or (b) not belong to a share combination confirmed by the decryption unit.

2. The method for receiving a data through multiple communication paths of claim 1, wherein determining the integrity includes in response to detection of all of the plurality of recovered data being the same as each other, deciding whether all of the received shares having not been forged.

3. The method for receiving a data through multiple communication paths of claim 1, wherein determining the integrity includes:
   confirming share combinations used to generate recovered data that are same as each other among the plurality of recovered data;

finding a share set consisting of shares belonging to at least one of the confirmed share combinations;

determining a share whether the share not belong to the share set among the received shares; and in response to detection of the share not belong to the share set among the received shares, confirming the share having been forged.

4. The method for receiving a data through multiple communication paths of claim 1, further comprising:

reestablishing one or more communication paths to the apparatus for sending a data for excluding a communication path through which a share decided to be forged among the received shares is sent.

5. The method for receiving a data through multiple communication paths of claim 1, further comprising:

requesting the apparatus for sending a data to resend the n shares or for reestablishing one or more communication paths to the apparatus for sending a data in response to detection that recovered data being the same as each other among the recovered data are not present.

6. The method for receiving a data through multiple communication paths of claim 1, wherein the shares are generated by a number of communication paths between the apparatus for sending a data and the apparatus for receiving a data.

7. The method for receiving a data through multiple communication paths of claim 1, wherein the n shares are received together with identification information on the unit data to which the n shares belong.

8. An apparatus for receiving a data through multiple communication paths, comprising:

a processor;

one or more units comprising executable code configured and executed by the processor using algorithm associated with a non-transitory storage device, the one or more units comprising, a communicating unit configured to receive at least t of n shares generated from unit data by a threshold encryption scheme, the at least t of n shares being received through multiple communication paths via a network, wherein 0<t≤n and n and t are natural numbers;

a decrypting unit configured to recover the unit data using the at least t shares;

determine whether or not t or more of the n shares generated from the unit data have been received;

request for sending a data to resend shares that are not received among the n shares in response to detection of shares less than t of the n shares being received;

generate recovered data from each of share combinations consisting of the t shares in response to detection of shares exceeding the t of n shares being received;

the processor is configured to determine integrity of the received shares by comparing the plurality of recovered data with each other; and the decrypting unit further configured to determine whether at least one of the received shares having been forged in response to detection that a share of recovered data (a) not being same as each other among the plurality of recovered data or (b) not belong to a share combination confirmed by the decryption unit.

9. The apparatus for receiving a data of claim 8, wherein the decrypting unit decides that all of the received shares have not been forged in response to detection of all of the plurality of recovered data being the same as each other.

10. The apparatus for receiving a data of claim 8, wherein the decrypting unit confirms share combinations used to generate recovered data that are same as each other among the plurality of recovered data, finds a share set consisting of shares belonging to at least one of the confirmed share combinations, determines a share whether the share not belong to the share set among the received shares, and in response to detection of the share not belong to the share set among the received shares, confirms the share having been forged.

11. The apparatus for receiving a data of claim 8, further comprising:

a communication path establishing unit configured to reestablish one or more communication paths to the apparatus for sending a data to exclude a communication path through which a share decided to be forged among the received shares is sent.

12. The apparatus for receiving a data of claim 8, further comprising:

a communication path establishing unit configured to request the apparatus for sending a data to resend the n shares or to reestablish one or more communication paths to the apparatus for sending a data in response to detection that recovered data being the same as each other among the recovered data are not present.

* * * * *